Mar. 27, 1923.
G. LEAVITT
DOUGHNUT FRYER
Filed June 8, 1921
1,449,948
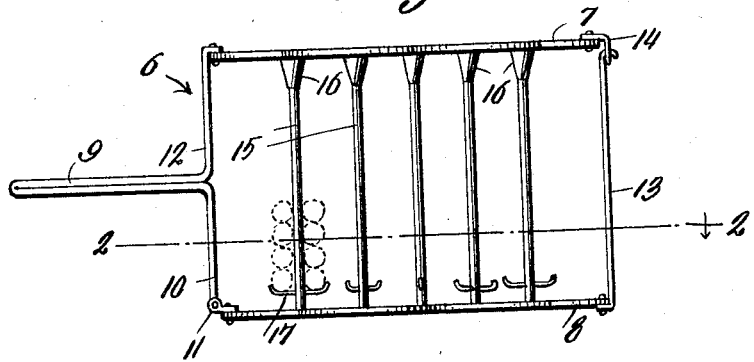
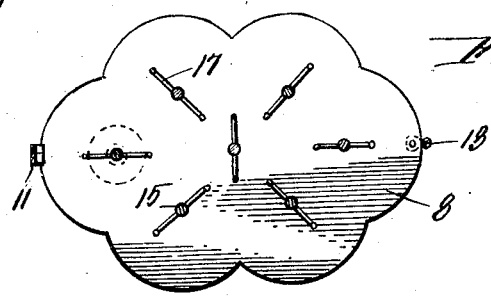
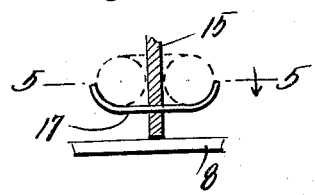 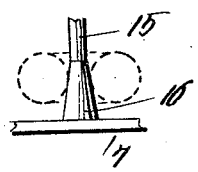
GRACE LEAVITT INVENTOR.
WITNESSES
BY
ATTORNEY.

Patented Mar. 27, 1923.

1,449,948

UNITED STATES PATENT OFFICE.

GRACE LEAVITT, OF ASHLAND, OREGON.

DOUGHNUT FRYER.

Application filed June 8, 1921. Serial No. 475,979.

*To all whom it may concern:*

Be it known that I, GRACE LEAVITT, a citizen of the United States, residing at Ashland, in the county of Jackson and State of Oregon, have invented certain new and useful Improvements in Doughnut Fryers, of which the following is a specification.

This invention relates to cooking utensils and more particularly to the type for frying doughnuts.

An important object of the invention is to provide a cooking utensil having means for supporting victuals to be cooked in a manner that they will not fall against one another when the utensil is turned upside down to brown the victuals evenly upon both sides.

Another important object of the invention is to provide a cooking utensil of the type mentioned having a laterally extending handle whereby the utensil may be readily turned upside down in an easy manner and without any liability of the chef becoming burned.

A further object of the invention is to provide means for preventing the victuals from contacting with the top and bottom of the utensil during the frying operation.

A still further object of the invention is to provide a utensil of the above nature from which the victuals may be easily removed after they have been cooked.

Other objects and advantages of the invention will become apparent during the course of the following description.

In the accompanying drawing forming a part of the application and wherein like numerals are employed to designate like parts throughout the several views.

Figure 1 is a side elevation of the invention,

Figure 2 is a horizontal section through the same,

Figure 3 is an enlarged detail section of one of the doughnut supporting elements.

Figure 4 is an enlarged fragmentary view of the upper portion of one of the doughnut supporting elements, and Figure 5 is a transverse section taken on the line 5—5 of Figure 3.

Referring now more particularly to the drawing wherein for the purpose of illustration is shown the preferred embodiment of my invention, the numeral 6 designates the fryer in general which consists generally of a frame embodying a top 7 and a bottom 8 of substantially the same construction. In the present instance the top and bottom are shown as consisting of plates having fluted edges of any chosen design.

The handle 9 of the frame preferably consists of a single length of stout wire bent upon itself intermediate of its ends. The free ends of the wire are bent at right angles to the handle and extend in opposite direction, one of the ends 10 being hingedly connected as at 11 to one end of the bottom of the frame. The other end of the wire is rigidly fastened to a corresponding end of the top 7. It will therefore be obvious that the top is hinged to the bottom 8 and that the handle 9 of the device extends laterally from the frame to simplify by handling of the utensil. The end of the bottom 8 opposite the pivotal connection 11 is provided with a hook 13 which may be pivotally or rigidly as desired, secured to the bottom 8. However, when the hook 13 is in an operative position, it extends vertically from the bottom 8 and terminates in a hooked end for cooperation with a loop 14 whereby the top 7 may be retained in its normal parallel relation with the bottom 8. This loop may also be either pivotally or rigidly connected to the top, depending upon the manner of connecting the hook 13 to the bottom.

In order to support doughnuts in stacks between the top and bottom and to prevent the doughnuts of one stack contacting with those of another, a plurality of spaced tubes 15 are secured to the underside of the top 7 to depend therefrom. These tubes are of such a length that their free ends abut the bottom 8 of the frame when the top is arranged parallel to the bottom 8 of the frame when the top is arranged parallel to the bottom 8 of the frame when the top is arranged parallel to the bottom. It will be noted that the ends of the tubes which are fastened to the top are of inverted frustro-conical shape whereby the doughnuts are prevented from contacting with the top 7 when the utensil is turned upside down. In order to prevent contact of the doughnuts with the bottom 8, a pin 17 is inserted through an opening extending transversely through the lower end of each tube. These openings are of course spaced from the free ends of the tubes whereby the doughnuts may be supported in stacks spaced from the bottom of the utensil. The free ends of the pins 17 may be curved upwardly so as to limit lateral movement of the doughnuts.

From the foregoing description, it will be obvious that when it is desired to use the device, the hook 13 is disengaged from the loop 14 whereby the handle 9 may be operated to cause the top 7 to move away from the bottom 8. The tubes 15 being carried by the top, their free ends will become disengaged from the bottom 8. The pins 17 are then removed so that the raw doughnuts may be placed upon the various tubes 15. The utensil may be held so that the tubes 15 are disposed horizontally while the raw doughnuts are being placed thereon so that one doughnut will not be imposed upon another with the result of their sticking together. After the several tubes have been filled, the pins 17 are then inserted through the openings in the lower ends of the tubes and the top 7 permitted to swing toward the bottom until the lower ends of the tubes abut the bottom. The hook 13 is then engaged with the loop 14 so that the top and bottom may be retained in their proper relationship with the lower ends of the tubes abutting the bottom.

The utensil may then be inserted bottom first into a suitable utensil containing hot lard and the doughnuts well be caused to rise to the upper ends of the tubes but will be prevented from contacting with the top 7 due to the frustro-conical formation of the upper ends of the tubes. When the doughnuts have become browned upon one side, the utensil is lifted by the handle 9 and consequently as the doughnuts are lifted from the hot lard, they will slide down the tubes 15 to engage the pins 17 which will prevent them from engaging the bottom 8. The handle 9 being disposed laterally of the utensil, it will be obvious that the latter may be quickly turned upside down and reinserted into the receptacle containing the lard. It will also be obvious that the utensil may be turned so that the tubes 15 are disposed horizontally to permit the doughnuts to drain after they have been cooked and consequently the lard will not drip or run from one doughnut to another. After they have been sufficiently drained, the hook 13 is released so that the top 7 and tubes 15 may be swung upwardly to permit the doughnuts to slide therefrom onto a suitable tray.

The foregoing description and accompanying drawings have reference to what might be considered to be the approved or preferred form of my invention. I desire it to be understood that I may make such changes in the construction, combination and arrangement of parts, material, dimensions, etc., as may prove expedient and fall within the scope of the appended claims.

Having thus fully described my invention what I claim as new and desire to secure by Letters Patent is:

1. A doughnut fryer comprising a frame, a plurality of spaced upright cylindrical doughnut supporting elements adapted to receive doughnuts, and means carried by the elements for preventing the doughnuts from contacting with the frame.

2. A doughnut fryer comprising a frame, a plurality of tubes carried thereby and said tubes being provided at their ends with frustro-conical elements to prevent the doughnuts from contacting with the frame.

3. A doughnut fryer comprising a frame, a plurality of doughnut supporting tubes carried thereby, said tubes being provided with removable pins for preventing the doughnuts from contacting with the frame.

4. A doughnut fryer comprising a frame, said frame comprising a top and bottom, said top being hinged to the frame, a handle connected to both the top and bottom whereby the top and bottom are retained in spaced relation, said handle being hingedly connected to the bottom and being extended laterally of the frame, and a plurality of tubes extending from the top and adapted to abut the bottom when the frame is closed.

5. A doughnut fryer comprising a frame, a plurality of tubes carried thereby, said tubes being provided at one end with frustro-conical elements, said tubes being provided near their opposite ends with removable pins, said frustro-conical elements and removable pins being provided for preventing the doughnuts from contacting with said frame.

In testimony whereof I affix my signature in presence of two witnesses.

GRACE LEAVITT.

Witnesses:
 ROSA LEAVITT,
 G. G. EUBANKS.